US011909016B2

(12) United States Patent
Smith

(10) Patent No.: US 11,909,016 B2
(45) Date of Patent: Feb. 20, 2024

(54) RECYCLING PROCESS FOR ISOLATING AND RECOVERING RARE EARTH METALS AND NICKEL HYDROXIDE FROM NICKEL METAL HYDRIDE BATTERIES

(71) Applicant: American Hyperform, Inc., Philadelphia, PA (US)

(72) Inventor: William Novis Smith, Philadelphia, PA (US)

(73) Assignee: American Hyperform, Inc., Philadelphia, PA (US)

( * ) Notice: Subject to any disclaimer, the term of this patent is extended or adjusted under 35 U.S.C. 154(b) by 0 days.

(21) Appl. No.: 17/890,314

(22) Filed: Aug. 18, 2022

(65) Prior Publication Data

US 2023/0335815 A1 Oct. 19, 2023

Related U.S. Application Data

(60) Provisional application No. 63/236,297, filed on Aug. 24, 2021.

(51) Int. Cl.
| | | |
|---|---|---|
| *H01M 10/54* | (2006.01) | |
| *C22B 59/00* | (2006.01) | |
| *C01G 53/04* | (2006.01) | |
| *C22B 7/00* | (2006.01) | |
| *C22B 3/08* | (2006.01) | |
| *H01M 4/525* | (2010.01) | |
| *H01M 10/052* | (2010.01) | |

(Continued)

(52) U.S. Cl.
CPC ............ *H01M 10/54* (2013.01); *C01G 53/04* (2013.01); *C22B 3/08* (2013.01); *C22B 3/22* (2013.01); *C22B 7/007* (2013.01); *C22B 59/00* (2013.01); *H01M 4/525* (2013.01); *H01M 10/052* (2013.01); *H01M 2004/028* (2013.01)

(58) Field of Classification Search
CPC .... H01M 10/54; H01M 4/525; H01M 10/052; C01G 53/04; C22B 3/08; C22B 3/22; C22B 7/007; C22B 59/00
See application file for complete search history.

(56) References Cited

U.S. PATENT DOCUMENTS

| | | |
|---|---|---|
| 2,801,153 A | 7/1957 | Dwyer |
| 6,120,927 A | 9/2000 | Hayashi |
| 7,458,419 B2 | 12/2008 | Nold, III et al. |

(Continued)

FOREIGN PATENT DOCUMENTS

| | | |
|---|---|---|
| CN | 101871048 B | 5/2012 |
| CN | 105206889 B | 10/2018 |

(Continued)

*Primary Examiner* — James A Fiorito

(74) *Attorney, Agent, or Firm* — Blanchard Horton PLLC

(57) ABSTRACT

A hydrometallurgical process is described that can isolate and recover NIMH battery constituents in high-value form: the nickel and cobalt hydroxides (cathode) as nickel and cobalt hydroxides; elemental nickel and cobalt (metallic anode) as nickel and cobalt hydroxides; rare earth metals (metallic anode) as oxides of rare earth metals, conductive carbon (electrodes) as conductive carbon, and the magnetic nickel-plated steel grids (electrodes) and battery cases in a relatively clean and directly smeltable form. The isolation portion of the process isolates the rare earth metals in oxide form from the nickel hydroxide and the cobalt hydroxide. If present, titanium, aluminum, and yttrium are isolated as oxides with the rare earth metal oxides.

29 Claims, 1 Drawing Sheet

(51) Int. Cl.
 *C22B 3/22* (2006.01)
 *H01M 4/02* (2006.01)

(56) References Cited

U.S. PATENT DOCUMENTS

| | | |
|---|---|---|
| 8,246,717 B1 | 8/2012 | Smith et al. |
| 8,252,085 B1 | 8/2012 | Smith et al. |
| 8,696,788 B1 | 4/2014 | Smith et al. |
| 10,246,343 B2 | 4/2019 | Chow et al. |
| 10,919,046 B2 | 2/2021 | Kochhar et al. |
| 11,142,466 B2 | 10/2021 | Bourassa et al. |
| 11,316,208 B2 | 4/2022 | Smith |
| 2011/0250499 A1 | 10/2011 | Hiratsuka |
| 2015/0040685 A1 | 2/2015 | Nicholson |
| 2016/0045841 A1 | 2/2016 | Kaplan |
| 2019/0260100 A1 | 8/2019 | Sloop |
| 2020/0000787 A1 | 3/2020 | Kochhar et al. |
| 2021/0000780 A1 | 3/2021 | Kochhar et al. |
| 2021/0079495 A1 | 3/2021 | Harris et al. |
| 2022/0013815 A1 | 1/2022 | Smith |
| 2023/0322578 A1 | 10/2023 | Smith |

FOREIGN PATENT DOCUMENTS

| | | |
|---|---|---|
| CN | 111129632 A | 7/2021 |
| WO | 2017091562 A1 | 6/2017 |
| WO | 2022010975 A1 | 1/2022 |

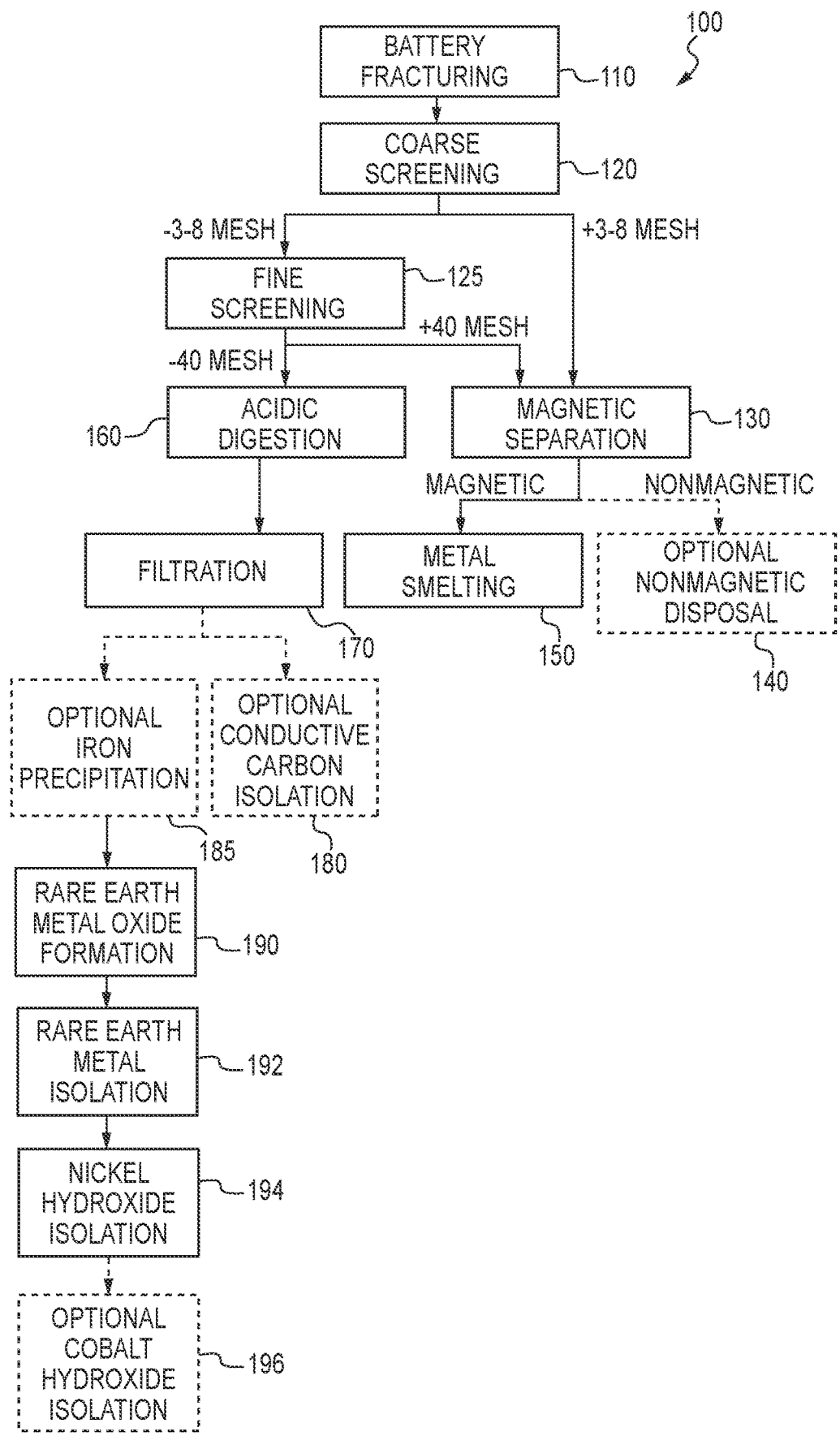

RECYCLING PROCESS FOR ISOLATING AND RECOVERING RARE EARTH METALS AND NICKEL HYDROXIDE FROM NICKEL METAL HYDRIDE BATTERIES

REFERENCE TO RELATED APPLICATIONS

This application claims the benefit of U.S. Provisional Application No. 63/236,297 entitled "Recycling Process for Recovering Nickel Hydroxide from Nickel Metal Hydride Batteries" filed Aug. 24, 2021, which is incorporated by reference in its entirety.

BACKGROUND

Nickel metal hydride batteries (NIMH) have been used for over 40 years for their stable and safe performance in hybrid electric vehicles and otherwise. Nickel metal hydride batteries (NIMH) contain nickel metal, cobalt metal, nickel coated steel grids, nickel hydroxide, cobalt hydroxide, rare earth metals, plastic, and conductive carbon. These constituents are usually contained within a nickel coated steel case. The total nickel content of an end-of-life NIMH battery constitutes from 25-50% by weight of the battery and has significant recovery value from both commercial and sustainability perspectives as nickel is a critical material in the production of many products.

The electrodes of NIMH batteries are formed from nickel coated steel grids on which different electrode materials are coated for the cathode and anode. The cathode material of a NIMH battery is formed of nickel hydroxide with a relatively small amount of cobalt hydroxide generally in the range of 5% to 6% by weight of the cathode material. The anode material of a NIMH battery is a reversible hydrogen absorbing metal alloy formed from a mixture including elemental nickel (30-35% by weight of the anode material) with a relatively small amount of elemental cobalt, rare earth metals sometimes referred to as "Misch metal" (50-70% by weight of the anode material), and manganese metal. The anode material also may include titanium, zirconium, yttrium, aluminum, and traces of other metals.

The currently used conventional commercial process to recover nickel from end-of-life NIMH batteries is to shred, chop, hammer, or otherwise fracture the battery cases. The resulting fractured mixture of larger pieces includes grid pieces, separator pieces that may be plastic or fiberglass, and other plastic pieces. The fractured mixture also includes a powder including elemental nickel and cobalt, conductive carbon powder, traces of damp potassium hydroxide (KOH) electrolyte, rare earth metals, and nickel hydroxide including cobalt hydroxide.

A typical break down of the fractured end-of-life NIMH battery materials is provided in Table I, below:

TABLE I

| Material | Properties | Weight Percent of Dry Crushed NIMH Batteries |
| --- | --- | --- |
| Nickel Plated Steel Grid Metals 20%-32% Nickel | Magnetic + 5-Mesh | 41% |
| Plastic Components with some Stainless Steel | Nonmagnetic + 5-Mesh | 14% |
| Powder including nickel, cobalt, Ni(OH)$_2$, Rare Earth Metals, conductive carbon | −5-Mesh | 45% |
| | Total | 100% |

TABLE I-continued

The fractured mixture is then roasted or pyrolyzed at greater than 500° C. to burn off all the consumables including the plastic and the rare earth metals, so only the nickel and cobalt containing material including the nickel-plated steel grids and casings remain. The roasting is energy intensive and creates significant dust and gases that must be scrubbed.

The resulting roasted material is generally sold to smelters based solely on its nickel content at a 15% discount to nickel metal due to the included contaminants. The roasted material is then smelted to recover the nickel as ferronickel (a combination of iron and nickel metals), thus removing the contaminants. With such conventional roasting, significant amounts of nickel and cobalt are lost in the smelter slag, in addition to the loss of the rare earth metals.

Such conventional recovery fails to recover the contained nickel hydroxide as nickel hydroxide, and instead recovers the nickel hydroxide as ferronickel due to contamination with the steel from the electrode grids and battery cases. Nickel hydroxide is commercially made from refined nickel metal, which is dissolved in acid and then precipitated as the hydroxide, thus, making nickel hydroxide of significantly higher value than nickel metal.

Many applications exist for nickel hydroxide, including battery cathode formation, where it is desirable for the nickel hydroxide to include a few percent of cobalt hydroxide, and catalysts. While not the highest-value use, nickel hydroxide is readily convertible to nickel metal through electrolysis without the need for smelting. Thus, the loss of the nickel/cobalt hydroxide originally present in the NIMH batteries by conventional recovery processes is unfortunate as nickel hydroxide generally is sold at a 30% premium in relation to elemental nickel metal due to the additional processing required to make nickel hydroxide from nickel metal.

The conventional recovery process makes no attempt to recover the equivalent of 5-7% of the total battery weight provided by the included rare earth metals present in the hydrogen absorbing metal alloy forming the anode material. In addition to batteries, rare earth metals are highly sought after for their use in making high intensity lightweight magnets and the corresponding high power density electric motors for wind turbines and electric vehicles. Other uses of rare earth metals include the manufacture of LED screens for televisions and computers. Rare earth metals are considered strategic materials since there are few international sources of these materials, with approximately 90% of the world supply presently coming from a single source. The hydrogen absorbing metal alloy may also include yttrium, titanium, aluminum, and traces of other metals.

The conventional recovery process also makes no attempt to recover the high purity conductive carbon which can be up to 15% by weight of the battery and is another material for which current demand exceeds supply.

Thus, conventional recovery processes for nickel are not efficient and fail to recover the battery constituents in high-value form: the nickel and cobalt hydroxides (cathode) as nickel and cobalt hydroxides; elemental nickel and cobalt (anode) as nickel and cobalt hydroxides; rare earth metals (anode) as oxides of rare earth metals, conductive carbon (electrolyte) as conductive carbon, and the magnetic nickel-plated steel grids (electrodes) in a clean and directly smeltable form.

In relation to conventional roasting and smelting, a known hydrometallurgical process recovers the reversible hydrogen absorbing metal alloy powder directly from an isolated black mass powder from crushed NIMH batteries. The recovered alloy includes the rare earth metals in addition to the nickel and cobalt. However, there does not appear to be significant market demand for the recovered hydrogen absorbing metal alloy for direct reuse in new battery formation. This process may be found in U.S. Pat. No. 8,246,717 B1, titled "Process for the Recovery of Metals from Used Nickel/Metal Hydride Batteries", filed Aug. 23, 2010; U.S. Pat. No. 8,252,085 B1 titled "Process for the Recovery of Metals from Used Nickel/Metal Hydride Batteries", filed Apr. 6, 2011; and U.S. Pat. No. 8,696,788 titled "Process for the Recovery of AB5 Alloy from Used Nickel/Metal Hydride Batteries", filed Oct. 26, 2012.

As can be seen from the above description, an ongoing need exists for a low-cost, relatively low-energy, hydrometallurgical process that isolates and recovers NIMH battery constituents in high-value form as opposed to recovering only the nickel constituent of the batteries as nickel metal or an iron contaminated ferronickel. The present invention avoids or ameliorates at least some of the disadvantages of conventional nickel and other metal recovery from end-of-life NIMH batteries.

SUMMARY

In one aspect, a hydrometallurgical process for recovering rare earth metals and nickel hydroxide from nickel metal hydride batteries is disclosed, the process comprising: fracturing nickel metal hydride batteries into larger pieces and a granular powder, where the larger pieces comprise battery case pieces, nickel-plated steel metal pieces, plastic pieces, and battery separator pieces, and where the granular powder comprises nickel hydroxide, cobalt hydroxide, conductive carbon, potassium hydroxide, and a reversible hydrogen absorbing metal alloy comprising rare earth metals, nickel metal, and cobalt metal; coarse screening the larger pieces and the granular powder to produce a screened coarse powder and unscreened larger pieces; fine screening the coarse powder to produce a screened fine powder and unscreened remaining pieces; digesting the screened fine powder in acid at a pH from 1.8 to 4.2 to produce a digested material; filtering the digested material to remove undigested solids from an acidification filtrate liquid, where the undigested solids comprise conductive carbon; raising the pH of the acidification filtrate liquid to a pH from 4.7 to 6 with heating from 60 to 80 degrees Centigrade to precipitate rare earth metal oxides and form a rare earth metal oxide slurry; filtering the rare earth metal oxide slurry to recover a rare earth metal oxide powder and produce a rare earth metal isolation filtrate; raising the pH of the rare earth metal isolation filtrate to a pH greater than 6 with heating from 60 to 85 degrees Centigrade to precipitate nickel hydroxide and form a nickel hydroxide slurry; and filtering the nickel hydroxide slurry to recover nickel hydroxide and produce a nickel hydroxide isolation filtrate. The process can isolate and recover cobalt hydroxide and can recover the isolated conductive carbon in a reusable form In another aspect of the invention, there is a process for using the isolated and recovered nickel hydroxide to form cathode materials for lithium batteries.

In another aspect of the invention, there is a process for using the isolated and recovered cobalt hydroxide to form cathode materials for lithium batteries.

In another aspect of the invention, there is a lithium battery including the nickel hydroxide recovered from the process.

Other systems, methods, features, and advantages of the invention will be, or will become, apparent to one with skill in the art upon examination of the following FIGURES and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description. The figures are intended to illustrate the principles of the invention.

FIG. 1 represents a hydrometallurgical process illustrating a method for isolating and recovering NIMH battery constituents.

DETAILED DESCRIPTION

A hydrometallurgical process is described that can isolate and recover NIMH battery constituents in high-value form: the nickel and cobalt hydroxides (cathode) as nickel and cobalt hydroxides; elemental nickel and cobalt (metallic anode) as nickel and cobalt hydroxides; rare earth metals (metallic anode) as oxides of rare earth metals, conductive carbon (electrodes) as conductive carbon, and the magnetic nickel-plated steel grids (electrodes) and battery cases in a relatively clean and directly smeltable form. The isolation portion of the process isolates the rare earth metals in oxide form from the nickel hydroxide and the cobalt hydroxide. If present, titanium, aluminum, and yttrium are isolated as oxides with the rare earth metal oxides.

Isolation of the rare earth metals, titanium, aluminum, and yttrium from the nickel/cobalt hydroxide and other materials prior to recovery significantly increases the purity of the recovered nickel and cobalt hydroxides to maximize their recovery value as the nickel and cobalt hydroxides are not "contaminated" with rare earth metals, titanium, aluminum, and yttrium. The process additionally allows for the isolation and recovery of the metal grids and battery cases in a high-value smeltable form and optional recovery of the conductive carbon in a reusable form.

FIG. 1 represents a hydrometallurgical process illustrating a method 100 for isolating and recovering NIMH battery constituents. The method 100 provides the recovered rare earth metal NIMH battery constituents in high-value oxide form and provides the nickel and cobalt NIMH battery constituents in sulfate or hydroxide high-value form.

In battery fracturing 110, end-of-life NIMH batteries are fractured by shredding, chopping, grinding, hammer milling, or the like to produce a fractured mixture including larger battery pieces and a granular powder. The fracturing may be performed dry or with a water spray, depending on the type of fracturing used. The resulting fractured mixture of larger pieces and granular powder includes battery case pieces, nickel-plated steel metal grid pieces, plastic pieces, battery separator pieces, residual conductive carbon powder, traces of damp potassium hydroxide (KOH) electrolyte powder, metal hydride rare earth alloy anode powder including nickel and cobalt metal, and nickel hydroxide cathode powder including cobalt hydroxide.

In coarse screening 120, the fractured mixture is screened using a coarse screen (3- to 8-mesh, with 5- to 6-mesh being preferred) to isolate the larger pieces of metal, plastic, and separators from the resulting coarse powder. The coarse screening 120 may be performed dry or with water by slurrying the larger pieces and the coarse powder in water before screening. While not represented in the FIGURE, the larger pieces of metal, plastic, and separators may be washed with water to recover coarse powder adhered to the larger pieces to obtain additional coarse powder.

In fine screening 125, the coarse powder from the coarse screening 120 is slurried in water and screened using a fine screen (preferably a 40-mesh or less) to separate the remaining pieces of metal, plastic, and separators from the resulting fine powder. While not represented in the FIGURE, the remaining pieces of metal, plastic, and separators may be washed with water to recover fine powder adhered to the remaining pieces to obtain additional fine powder.

In magnetic separation 130, the larger pieces of metal and plastic isolated from the coarse screening 120 and the pieces of metal and plastic isolated from the fine screening 125 are subjected to a magnetic separation which separates the electrode grids, including nickel-plated steel metal pieces, and battery case pieces from the plastics and battery separators. Optionally, a magnet also may be passed through the fine powder resulting from the fine screening 125 to provide additional magnetic metal recovery that may be passed to metal smelting 150, as discussed further below. While the magnetic separation 130 as represented in the FIGURE is preferred, it is possible to omit this step and send the pieces isolated from the coarse screening 120 and from the fine screening 130 directly to metal smelting 150, as discussed further below.

In optional nonmagnetic disposal 140, the nonmagnetic plastic and battery separator pieces isolated in the magnetic separation 130 are disposed of through recycling or as nonhazardous waste. While not shown in the FIGURE, the nonmagnetic plastic and battery separator pieces may be washed with water or sulfuric acid having a pH from 2 to 3 to dissolve any nickel residue before the nonmagnetic materials are recycled or disposed of. This acidic wash including dissolved nickel from the nonmagnetic pieces is preferably transferred to acidic digestion 160, as further discussed below.

In the metal smelting 150, the magnetic electrode grids and battery cases isolated in the magnetic separation 130 are smelted to produce ferronickel matte or similar mixed metal product. If the optional nonmagnetic disposal 140 is omitted as the magnetic separation 130 was not performed, then the metal, plastic, and separator pieces recovered from the coarse screening 120 and from the fine screening 125 are smelted to recover the metals while burning off the nonmagnetic materials. Any nonmagnetic ceramics would be removed in the smelter slag.

In the acidic digestion 160, the fine powder produced from the fine screening 125 is acidified with acid at a pH from 1.8 to 4.2, preferably at a pH from 2 to 4, and at a temperature from room temperature to 50 degrees Centigrade. Preferable acids include sulfuric acid, nitric acid, hydrochloric acid, formic acid, and combinations thereof. More preferably, concentrated (95-97%) sulfuric acid is used. pH values much below 2 begin to dissolve the iron from the remaining fine particles of the electrode grids and battery cases, with pH values of 1 and below dissolving significant amounts of iron, which is undesirable.

Although the coarse powder produced from the coarse screening 120 includes from 10-25% by weight of "contaminants" produced from over-fracturing the electrode grids, and some portion of these contaminants are also present in the fine powder produced from the fine screening 125, the conditions of the acid digestion 160 do not significantly dissolve the unwanted iron component of the electrode grids and battery cases. The acidic digestion 160 dissolves the nickel and cobalt hydroxides from the cathode, and the rare earth metals, and the nickel and cobalt metals from the anode as their respective salts in view of the acid used. For example, when the acidic digestion 160 is performed with sulfuric acid, sulfates would form. Thus, the nickel and cobalt from both the cathode and anode are converted to nickel sulfate and cobalt sulfate, respectively, with the use of sulfuric acid. The acidic digestion 160 will also convert titanium, yttrium, and aluminum to their respective salts in view of the acid used, if such metals are present.

In filtration 170, the digested material from the acid digestion 160 is filtered to remove the undigested solids, including the conductive carbon and potentially residual iron to produce an acidification filtrate liquid. The recovered solids are in the form of a black filter cake including the conductive carbon. The filtration 170 is preferably a small particle filtration that removes solids in the 1 to 5 and larger micrometer range and may be affected using polypropylene, paper, fiberglass, stainless steel mesh, and the like as the filtration medium. Presently, polypropylene in the form of a 5-micrometer rated filter cloth is used as may be obtained from Lamport, Metchem, Micronics, IDRO filter Workshop, McMaster-Carr, Kavon Filter Products, and Shelco Filters, for example.

In optional conductive carbon isolation 180, the filter cake from the filtration 170 may be dried and screened through a screen having a mesh from 80 to 120, preferably of mesh 100, to isolate the conductive carbon in a reusable form. While not shown in the FIGURE, the screened material can be re-slurried and subjected to magnetic separation to isolate additional magnetic grid material that may be passed to the metal smelting 150 for additional ferronickel recovery.

In optional iron precipitation 185, the pH of the acidification filtrate liquid from the filtration 170 is increased through the addition of a base to increase the pH from 3 to 4.5, preferably from 3.3 to 3.7, with the addition of an oxidant to precipitate solubilized iron that may be present. The base is preferably an alkali-hydroxide aqueous base. Preferably, the aqueous base is a 15% to 50% solution by weight of sodium hydroxide or potassium hydroxide in water, with sodium hydroxide being preferred due to cost. Ammonia is not preferred as the base as the ammonia is not chemically compatible with some of the process steps. Preferred oxidants include air, oxygen, hydrogen peroxide, and persulfate, with air being preferred due to cost. The resulting iron precipitated slurry is then subjected to small particle filtration as previously discussed to recover precipitated ferric hydroxide which may be passed to the metal smelting 150 for recovery.

In rare earth metal oxide formation 190, the pH of the acidification filtrate liquid from the filtration 170 or from the optional iron precipitation 185 is increased through the addition of an aqueous base as previously discussed to a pH from 4.7 to 6, preferably to a pH from 5 to 5.5, and heated from 60 to 80 degrees Centigrade, preferably from 60 to 70 degrees Centigrade. Preferably, heating is performed for 30-minutes. When sulfuric acid is used in the acidic digestion 160, the rare earth metals are believed to be converted from sulfates to hydroxides and then to insoluble oxides which precipitate to form a rare earth metal oxide slurry.

In rare earth metal isolation 192, the slurry including rare earth metal oxides from the rare earth metal oxide formation 190 is filtered using small particle filtration as previously discussed to isolate a cream-colored rare earth metal oxide powder including oxides of the rare earth metals from the slurry and produce a rare earth metal isolation filtrate.

When sulfuric acid is used in the acidic digestion 160, the rare earth metal isolation filtrate from the rare earth metal isolation 192 includes nickel sulfate and up to 7% cobalt sulfate by weight of the salts contained in the rare earth metal isolation filtrate solution. The rare earth metal isolation filtrate solution may be dried to recover a sulfate hydrate of the nickel and cobalt and sold, such as for direct use in adjusting the nickel ratio of cathode materials for use in making lithium-ion batteries. However, in most instances it will be desirable to recover the nickel and cobalt as nickel hydroxide and cobalt hydroxide as discussed below.

In nickel hydroxide isolation 194, the pH of the rare earth metal isolation filtrate including nickel and cobalt salts from the rare earth metal isolation 192 is increased to a pH greater than 6, preferably to a pH from 7 to 8, and more preferably to a pH from 7.7 to 8, with heating from 60 to 85 degrees Centigrade, preferably from 60 to 80 degrees Centigrade, to precipitate solid nickel hydroxide. The pH increase is performed with an alkali-hydroxide aqueous base, preferably 50% sodium hydroxide in water by weight, but other or additional bases may be used that provide the desired nickel hydroxide precipitation as previously discussed. After the pH increase, the resulting slurry including precipitated nickel hydroxide is subjected to small particle filtration as previously discussed to isolate solid nickel hydroxide from the slurry and produce a nickel hydroxide isolation filtrate.

In optional cobalt hydroxide isolation 196, the pH of the nickel hydroxide isolation filtrate from the nickel hydroxide isolation 194 may be increased to a pH from 8.5 to 11, preferably to a pH from 9.5 to 10.5, with heating from 60 to 85 degrees Centigrade, preferably from 60 to 80 degrees Centigrade, to produce a cobalt hydroxide precipitated slurry. The pH increase is performed using an alkali-hydroxide aqueous base as previously discussed. After the pH increase, the resulting cobalt hydroxide precipitated slurry is subjected to small particle filtration as previously discussed to isolate precipitated cobalt hydroxide from the cobalt hydroxide precipitated slurry.

The following examples illustrate one or more preferred embodiments of the invention. Numerous variations may be made to the following examples that lie within the scope of the invention.

EXAMPLES

Example 1: Typical Battery Constituent Percentages Recovered by Process

TABLE 2

| Recovered Constituent | Weight Percent Recovered in Relation to Fractured NIMH Battery Weight |
| --- | --- |
| Non-Magnetic Including Plastic | 14% |
| Magnetic Including Electrode Grids | 36% |
| Rare Earth Oxides | 6% |
| Nickel Hydroxide | 25% |
| Cobalt Hydroxide | 3% |

TABLE 2-continued

| Recovered Constituent | Weight Percent Recovered in Relation to Fractured NIMH Battery Weight |
| --- | --- |
| Conductive Carbon | 21% |
| Total | 105%* |

*The apparent weight gain is believed attributable to the formation of hydroxides and oxides from the elemental metals included in the anode material.

Example 2: Isolation and Recovery from End-of-Life NIMH Car Batteries

End-of life NIMH automotive batteries were discharged and then fractured on a commercial fracturing line, such as a hammer mill as available from Schutte Buffalo or a shredder as available from commercial shredder manufactures. 7 kg of the fractured NIMH battery material was screened through a standard 5-mesh screen to produce a +5-mesh portion (3 kg) and a −5-mesh product (4 kg). The magnetic portion of the +5-mesh portion was removed with a large magnet to leave 1 kg of non-magnetic material. The +5 magnetic portion consisted of nickel coated steel grid material (2 kg) suitable for recovery in a smelter as a ferronickel product. A magnet was also passed through the −5-mesh material and produced 0.5 kg of finer magnetic grid material which was combined with the initial +5-mesh magnetic grid material.

This left 3.5 kg of fine black powder containing the nickel/cobalt hydroxide from the cathode, the reversible hydrogen absorbing metal alloy (AB5) from the anode, and conductive carbon.

100 g of the fine black powder was slurried at 30% solids by weight in water. Sulfuric acid was then slowly added to minimize the foaming from the initial hydrogen evolution as the AB5 alloy dissolved. The sulfuric acid (95 g) was added to obtain a stable pH of 2 at 50° C. After 30 minutes the slurry was filtered to produce a black filter cake containing the conductive carbon after drying and passing through a 100-mesh screen to screen out the coarser plastic, separator, and metal contaminants. The dry weight of the recovered conductive carbon was 42 g.

The liquid component (filtrate) recovered from the 100-mesh screening (filtrate) was green due the nickel sulfate. The pH of the filtrate was adjusted up to 5-6 and then heated to 60-70° C. for 30 min. The liquid was then filtered using a 5-10 micrometer polypropylene filter and dried to yield a cream-colored powder containing 12 g of the rare earth oxide.

The pH of the resulting nickel sulfate filtrate was then adjusted to 7.7-8 at 60° C. to precipitate the nickel hydroxide. The dried nickel hydroxide weighed 25 g.

The pH of the resulting filtrate was then adjusted to 10 and heated to further precipitate 1.5 g of cobalt hydroxide upon filtration.

Example 3: Establishing Criticality of the Acidic Digestion pH Range

The black powder (200 g) as formed in Example 2, but replacing the initial 5-mesh coarse screening with a 6-mesh coarse screening, was slurried in 400 ml water. Sulfuric acid (175 g) was added to minimize the foaming from the initial hydrogen evolution as the AB5 dissolved. The sulfuric acid was added to obtain a stable pH of 1.0 at 60° C. After 30 minutes the slurry was filtered to produce a black filter cake containing the conductive carbon. After drying the cake and passing it through a 100-mesh screen the conductive carbon weighed 66 g.

The pH of the green nickel sulfate containing filtrate was adjusted up to 5-6 and then heated to 60-70° C. for 30 minutes and then filtered and dried to yield a cream-colored powder when dried contained 23 g of the rare earth and other element oxides. The powder contained undesirable amounts of ferric oxide. The pH of the nickel/cobalt sulfate filtrate liquid was then adjusted to 7.0-7.5 at 60° C. to precipitate nickel hydroxide and then raised to 8.5-9 to precipitate cobalt hydroxide. (216 g of 50% NaOH was used.) The slurry was filtered to recover the solids which were a combination of nickel and cobalt hydroxides contaminated with undesirable iron oxide.

The filter cake was then washed and then repulped in water at 60° C. for one hour and then filtered and washed. The dried nickel and cobalt hydroxides weighed 166 g and was low in sulfate, <0.1%.

While desirable metals were recovered with this process, the criticality of the acidic digestion pH range was determined as the pH of 1.0 used in this example resulted in undesirable amounts of iron being dissolved into the solution and contaminating the rare earth metals and/or nickel hydroxide.

Example 4: Establishing Criticality of the Rare Earth Metal Isolation pH Range, the Nickel Hydroxide Isolation pH Range, and the Associated Temperature Ranges The initial NIMH black mass −5-mesh material (1150 g) from Example 2, which was not treated with a magnet, but was instead slurried with 3 liters of water and wet screened through a 40-mesh screen. 800 g of this electrode material passed through the screen as a slurry in 3 liters of water. 350 g of coarse metallic grid material and some plastic pieces were removed on the 40-mesh screen thus removing essentially all the nickel-plated steel and iron which increased the purity of the resulted extracted nickel sulfate solution.

Concentrated sulfuric acid (95-97%) (814 g) was added with stirring to this slurry over 2 hrs. while maintaining the pH between 1.8 and 4 at 40-50° C. with a final pH of 1.9.

The slurry was then filtered to produce a green, black solution of primarily nickel sulfate containing rare earth sulfates, cobalt sulfate, and some iron sulfate. The carbon filter cake was washed once with 200 mL of water which was combined with filtrate. The filter cake was washed further to produce a clean conductive carbon which on drying weighed 250 g and was suitable for reuse.

The nickel sulfate filtrate was added to a stirred reactor in parallel with the addition of 50% sodium hydroxide at the opposite side of the round reactor. The reactor contained a small amount of water heel to facilitate smooth reaction. The pH was maintained between 4-5. The addition required 1.5 hours at 30-40° C. and required 231 g of 50% sodium hydroxide. The thin slurry was then heated at 75-80° C. for one hour to precipitate the rare earth oxides which form irreversibly from the more soluble rare earth hydroxides. The slurry was filtered to produce an off-yellow-cream coarser powder which after washing and drying weighed 145 g. (17% of the −40-mesh).

While desirable rare earth metals were recovered with this process, the criticality of the rare earth metal pH range of 4.7 to 6 was determined for rare earth metal oxide formation as the pH of 4-5 used in this example resulted in undesirable amounts of iron oxides being formed and contaminating the rare earth metals.

The nickel sulfate filtrate solution now includes about 6-7% cobalt based on the solids weight. 50% sodium hydroxide at the opposite side of the round stirred reactor containing a minimum water heel for ease of reaction. The pH was maintained at 7.0 to 7.5 at 30-40° C. for the addition over 2 hours to precipitate nickel hydroxide.

While this process recovered nickel hydroxide, the criticality of the nickel hydroxide recovery pH and temperature ranges were determined as the pH and temperature ranges used in this example resulted in significant and thus undesirable amounts of nickel remaining in solution that "contaminated" the cobalt recovered in the next cobalt recovery step.

The pH was then adjusted up to 9.5 and then the green slurry heated to 80-85° C. for one hour and then cooled to 50° C. and filtered. A total of 607 g of 50% sodium hydroxide was used. The filter cake was washed three time and then the filter cake was repulped in 5 Liters of water and heated to 80-85° C. for one hour. It was then cooled to 50° C. and filtered. The filter cake was washed until the wash filtrate was essentially free of sulfate as determined by testing with barium acetate solution.

The dried filter cake weighed 480 g and was primarily nickel hydroxide as it analyzed essentially free of iron, lanthanum, and sulfate, while containing 7% cobalt by weight.

To provide a clear and more consistent understanding of the specification and claims of this application, the following definitions are provided.

Unless otherwise indicated, all numbers expressing quantities of constituents, percentages, pH values, and the like used in the specification and claims are to be understood as indicating both the exact values as shown and as being modified by the term "about". Thus, unless indicated to the contrary, the numerical values of the specification and claims are approximations that may vary depending on the desired properties sought to be obtained and the margin of error in determining the values. At the very least, and not as an attempt to limit the application of the doctrine of equivalents to the scope of the claims, each numerical parameter should at least be construed considering the margin of error, the number of reported significant digits, and by applying ordinary rounding techniques.

Unless the context clearly dictates otherwise, where a range of values is provided, each intervening value to the tenth of the unit of the lower limit between the lower limit and the upper limit of the range is included in the range of values.

The terms "a", "an", and "the" used in the specification claims are to be construed to cover both the singular and the plural, unless otherwise indicated or contradicted by context. No language in the specification should be construed as indicating any non-claimed element to be essential to the practice of the invention.

While the present general inventive concept has been illustrated by description of an example, it is not the intention of the applicant to restrict or in any way limit the scope of the general inventive concept to such description. Instead, the descriptions, drawings, and claims should be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

While various aspects of the invention are described, it will be apparent to those of ordinary skill in the art that other embodiments and implementations are possible within the scope of the invention. Accordingly, the invention is not to be restricted except considering the attached claims and their equivalents.

The invention claimed is:

1. A hydrometallurgical process for recovering rare earth metals and nickel hydroxide from nickel metal hydride batteries, the process comprising:
   fracturing nickel metal hydride batteries into larger pieces and a granular powder,
      where the larger pieces comprise battery case pieces, nickel-plated steel metal pieces, plastic pieces, and battery separator pieces, and
      where the granular powder comprises nickel hydroxide, cobalt hydroxide, conductive carbon, potassium hydroxide, and a reversible hydrogen absorbing metal alloy comprising rare earth metals, nickel metal, and cobalt metal;
   coarse screening the larger pieces and the granular powder to produce a screened coarse powder and unscreened larger pieces;
   fine screening the coarse powder to produce a screened fine powder and unscreened remaining pieces;
   digesting the screened fine powder in acid at a pH from 1.8 to 4.2 to produce a digested material;
   filtering the digested material to remove undigested solids from an acidification filtrate liquid, where the undigested solids comprise conductive carbon;
   raising the pH of the acidification filtrate liquid to a pH from 4.7 to 6 with heating from 60 to 80 degrees Centigrade to precipitate rare earth metal oxides and form a rare earth metal oxide slurry;
   filtering the rare earth metal oxide slurry to recover a rare earth metal oxide powder and produce a rare earth metal isolation filtrate;
   raising the pH of the rare earth metal isolation filtrate to a pH greater than 6 with heating from 60 to 85 degrees Centigrade to precipitate nickel hydroxide and form a nickel hydroxide slurry; and
   filtering the nickel hydroxide slurry to recover nickel hydroxide and produce a nickel hydroxide isolation filtrate.

2. The process of claim 1, where the coarse screening comprises screening with a 3- to 8-mesh screen.

3. The process of claim 2, where the coarse screening further comprises slurrying the larger pieces and the granular powder in water before passing the larger pieces and the granular powder through the screen.

4. The process of claim 1, further comprising washing the unscreened larger pieces with water to obtain additional coarse powder.

5. The process of claim 1, where the fine screening comprises screening with a 40-mesh or less screen.

6. The process of claim 5, further comprising washing the unscreened remaining pieces with water to obtain additional fine powder.

7. The process of claim 1, further comprising smelting at least one of the unscreened larger pieces and the unscreened remaining pieces to produce ferronickel.

8. The process of claim 1, further comprising subjecting the unscreened larger pieces and the unscreened remaining pieces to a magnetic separation, where the magnetic separation separates the battery case pieces and the nickel-plated steel metal pieces from the plastic pieces, and the battery separator pieces.

9. The process of claim 8, further comprising smelting the battery case pieces and the nickel-plated steel metal pieces to produce ferronickel.

10. The process of claim 1, further comprising passing a magnetic through the fine powder to recover additional magnet metal.

11. The process of claim 1, where the acid is selected from the group consisting of sulfuric acid, nitric acid, hydrochloric acid, formic acid, and combinations thereof.

12. The process of claim 1, where the acid is sulfuric acid.

13. The process of claim 1, where the digesting the screened fine powder in the acid is at a pH from 2 to 4.

14. The process of claim 1, where the digesting does not significantly dissolve iron from the screened fine powder.

15. The process of claim 12, where the digesting produces rare earth metal sulfates, nickel sulfate, and cobalt sulfate.

16. The process of claim 1, where the raising the pH of the acidification filtrate liquid comprises adding an alkali-hydroxide aqueous base to the acidification filtrate liquid.

17. The process of claim 1, where the filtering the rare earth metal oxide slurry is a small particle filtration, where the small particle filtration removes solids in a range 1 micrometer and larger.

18. The process of claim 17, where the small particle filtration is performed using polypropylene filtration medium.

19. The process of claim 1, where the undigested solids comprising conductive carbon are screened to isolate the conductive carbon.

20. The process of claim 19, further comprising subjecting the isolated conductive carbon to magnetic separation to remove additional magnetic metal.

21. The process of claim 1, further comprising adding an oxidant to the rare earth metal isolation filtrate to produce an iron precipitated slurry.

22. The process of claim 21, where the base is an aqueous alkali-hydroxide base, and the oxidant is air.

23. The process of claim 21, further comprising small particle filtering the iron precipitated slurry to recover precipitated ferric hydroxide.

24. The process of claim 1, where the raising the pH of the acidification filtrate liquid to a pH from 4.7 to 6 raises the pH of the acidification filtrate liquid to a pH from 5 to 5.5.

25. The process of claim 1, where the raising the pH of the rare earth metal isolation filtrate to a pH greater than 6 raises the pH of the rare earth metal isolation filtrate to a pH from 7 to 8.

26. The process of claim 25, further comprising raising the pH of the nickel hydroxide isolation filtrate to a pH from 8.5 to 11 with heating from 60 to 85 degrees Centigrade to produce a cobalt hydroxide precipitated slurry.

27. The process of claim 26, further comprising small particle filtering the cobalt hydroxide precipitated slurry to recover cobalt hydroxide.

28. The process of claim 1, further comprising using the nickel hydroxide to form cathode materials for lithium batteries.

29. The process of claim 27, further comprising using the cobalt hydroxide to form cathode materials for lithium batteries.

* * * * *